(12) United States Patent
Reese

(10) Patent No.: US 7,673,923 B2
(45) Date of Patent: Mar. 9, 2010

(54) HINGED WINDSHIELD ASSEMBLY AND METHOD FOR MANUFACTURING SAME

(75) Inventor: William Victor Reese, Thomson, GA (US)

(73) Assignee: Augusta Coating and Manufacturing, LLC, Thomson, GA (US)

( * ) Notice: Subject to any disclaimer, the term of this patent is extended or adjusted under 35 U.S.C. 154(b) by 44 days.

(21) Appl. No.: 12/045,747

(22) Filed: Mar. 11, 2008

(65) Prior Publication Data

US 2009/0230714 A1 Sep. 17, 2009

(51) Int. Cl.
B60J 1/06 (2006.01)
(52) U.S. Cl. .................................. 296/92; 296/84.1
(58) Field of Classification Search ............. 296/84.1, 296/86–89, 92, 146.16; 280/DIG. 5; 16/225, 16/255
See application file for complete search history.

(56) References Cited

U.S. PATENT DOCUMENTS

| | | | | |
|---|---|---|---|---|
| 2,423,623 A * | 7/1947 | Schassberger | ............... | 296/92 |
| 3,829,152 A | 8/1974 | Hobbs | | |
| 3,843,982 A * | 10/1974 | Lane et al. | ................... | 114/361 |
| 4,151,620 A * | 5/1979 | Heuzonter | ................... | 114/361 |
| 4,488,750 A | 12/1984 | Gerber | | |
| 4,563,381 A * | 1/1986 | Woodland | ................... | 428/156 |
| 4,670,938 A | 6/1987 | Fowlston | | |
| 4,819,979 A | 4/1989 | Moglia | | |
| 4,828,132 A * | 5/1989 | Francis et al. | ................... | 220/6 |
| 5,110,174 A * | 5/1992 | Andree | ...................... | 296/77.1 |
| 5,192,109 A | 3/1993 | Roberts | | |
| 5,195,797 A * | 3/1993 | Hobbs | ........................ | 296/77.1 |
| 5,377,857 A * | 1/1995 | Taravella et al. | ........... | 220/4.33 |
| 5,385,379 A * | 1/1995 | Heavner | ..................... | 296/84.1 |
| 5,385,390 A * | 1/1995 | Freeman et al. | .............. | 297/380 |
| 5,398,376 A * | 3/1995 | Pollack | ......................... | 16/225 |
| 5,538,178 A * | 7/1996 | Zink et al. | ............. | 229/117.01 |
| 5,566,849 A * | 10/1996 | Goehner | ........................ | 220/7 |
| 5,729,867 A * | 3/1998 | Carmichael | ................... | 16/225 |
| 5,784,982 A * | 7/1998 | Erskine | ....................... | 114/361 |
| 5,791,720 A * | 8/1998 | Moore et al. | ................ | 296/96.2 |
| 5,809,706 A * | 9/1998 | Neaux | ....................... | 52/204.51 |
| 5,915,780 A * | 6/1999 | Kobrehel et al. | ........ | 296/146.15 |
| 6,003,203 A * | 12/1999 | Fowlston | ...................... | 16/225 |

(Continued)

Primary Examiner—Glenn Dayoan
Assistant Examiner—Gregory Blankenship
(74) Attorney, Agent, or Firm—Myers Bigel Sibley & Sajovec

(57) ABSTRACT

A hinge assembly for a vehicle windshield comprises a first holder, a second holder, and a hinge member. The first holder includes a first body and a first receptacle with a first opening and a first closed end, wherein a first axis is defined between the first closed end and the first opening, the first axis being normal to a first plane defined by the first opening. The second holder includes a second body and a second receptacle with a second opening and a second closed end, wherein a second axis is defined between the second closed end and the second opening, the second axis being normal to a second plane defined by the second opening. The hinge member is attached to the first and second holder and has first and second ends and defines a third axis. When the hinge member is in a relaxed condition, the first and second axes form oblique angles relative to the third axis. In this configuration, the hinge member is under less strain in the both of the open and closed positions than is the case with prior hinges.

21 Claims, 3 Drawing Sheets

U.S. PATENT DOCUMENTS

| | | | |
|---|---|---|---|
| 6,719,363 B2 * | 4/2004 | Erlandsson et al. | 296/193.07 |
| 6,820,952 B2 * | 11/2004 | Austin et al. | 312/326 |
| 7,047,576 B2 * | 5/2006 | Tavivian | 4/596 |
| 7,267,388 B2 * | 9/2007 | Hanson et al. | 296/77.1 |
| 7,452,025 B2 * | 11/2008 | Grindle | 296/152 |

* cited by examiner

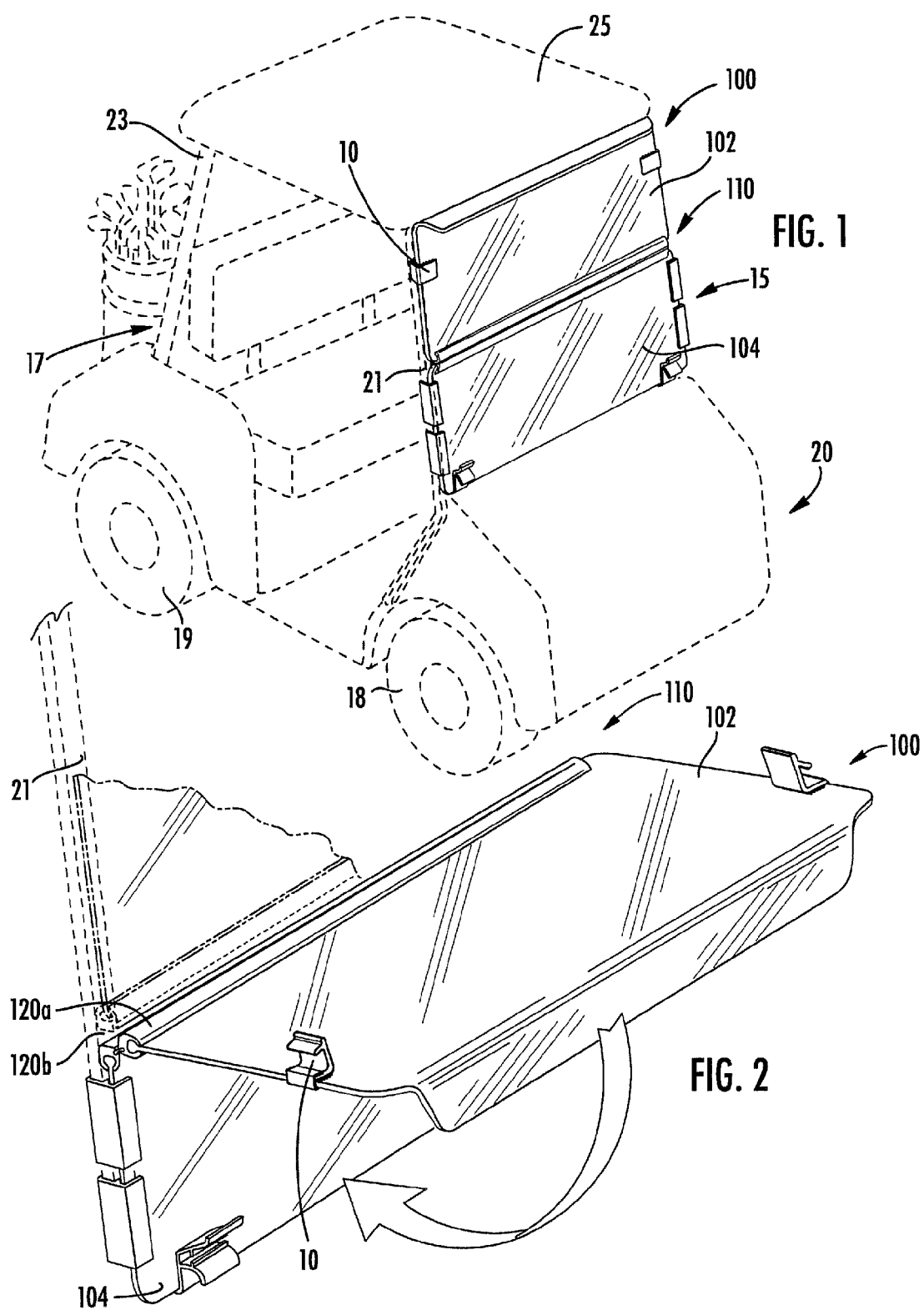

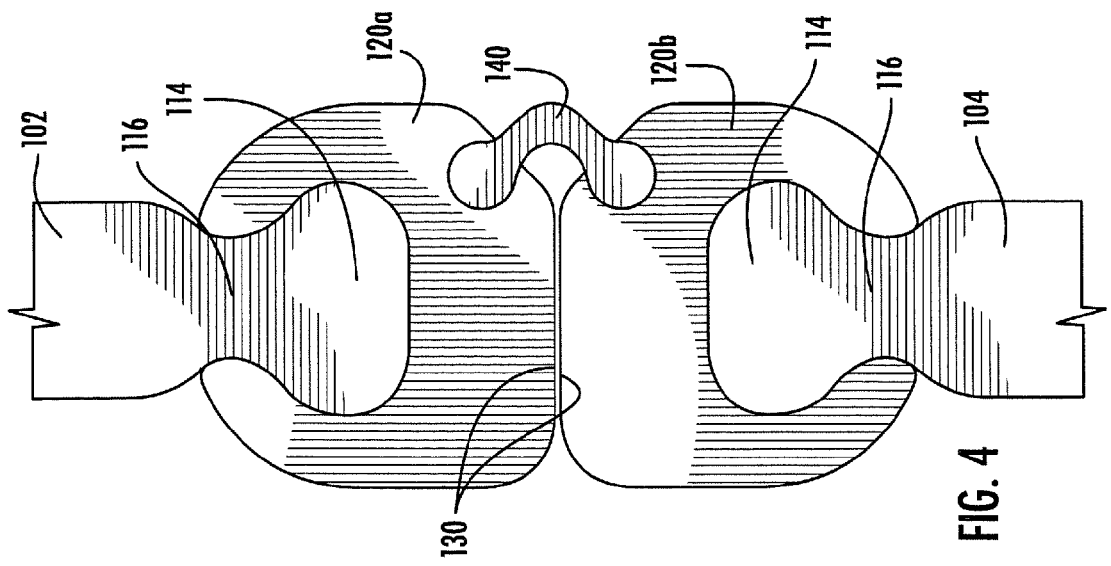
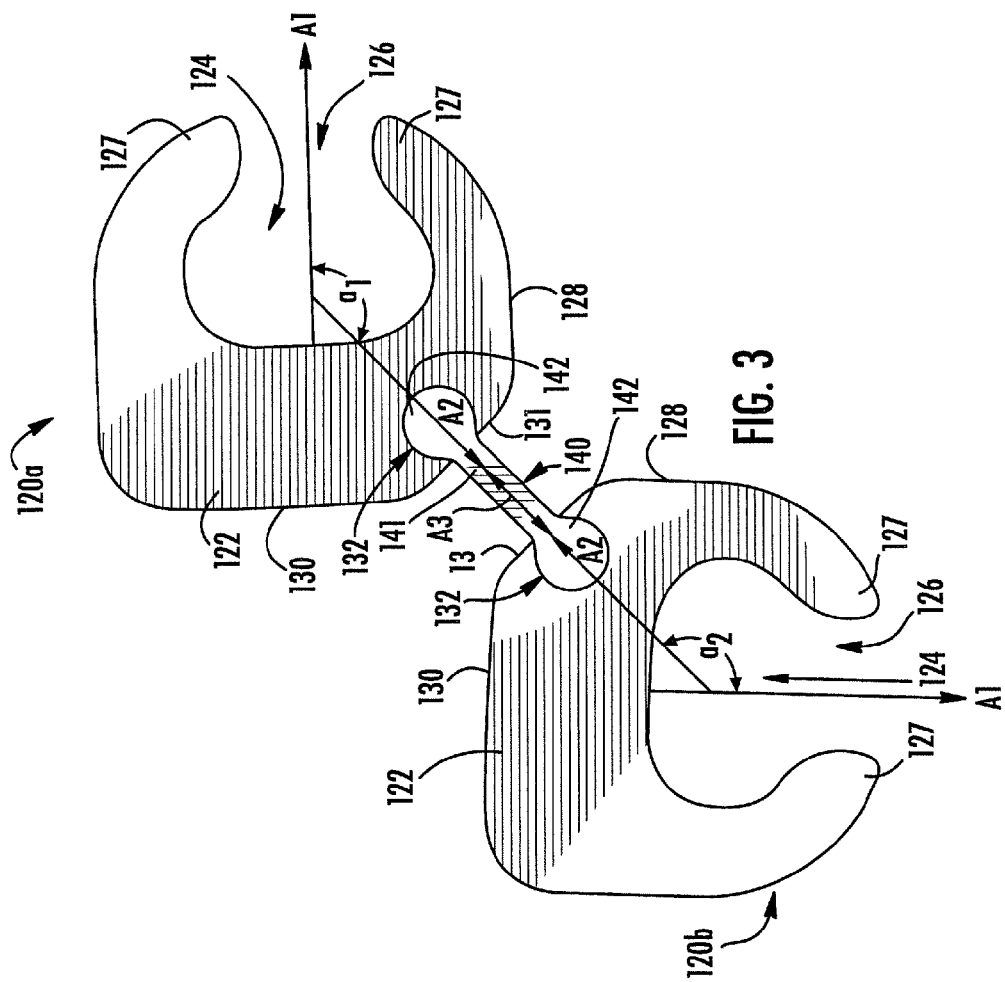

HINGED WINDSHIELD ASSEMBLY AND METHOD FOR MANUFACTURING SAME

FIELD OF THE INVENTION

The present invention relates generally to recreational vehicles such as golf carts or utility vehicles with releasably attached windshield assemblies, and more particularly to a holding device in a windshield assembly for releasably securing the windshield assembly to a recreational or utility vehicle.

BACKGROUND OF THE INVENTION

Recreational vehicles, including golf carts, are often supplied with top coverings or canopies and windshield assemblies to protect occupants from foul weather, wind and sun. Many conventional recreational vehicles, such as golf carts, include a frame support system attached to the cart body that includes front and rear vertical frame posts which support the top covering and windshield assembly. The windshield assembly is typically attached to the posts on the vehicle front and protects the occupants from wind and weather while moving.

Various types of windshield assemblies have been employed, including single and multi-panel windshields as well as windshields which open, are detachable or are fixed to the vehicle. Golf carts with windshield assemblies that open have been made in various forms. Many of these windshield assemblies include an upper panel that is hinged on its lower edge to a lower panel that is fixed to the vehicle. The upper panel is movable between a closed or raised position and an open or lowered position. In the closed position, the windshield panel is connected to the frame support posts, thereby blocking entry of wind or rain into the cab portion of the golf cart. In the open position, the panel is lowered away from the golf cart frame, thereby creating an opening for ventilation and the like.

The hinges that are typically employed to interconnect the upper and lower panels of the windshield typically include a flexible hinge member that fits between the upper edge of the lower panel and the lower edge of the upper panel. The hinge member is fixed to brackets or the like that are then attached to the windshield panels via screws, adhesive or the like. An exemplary windshield arrangement is disclosed in U.S. Pat. No. 5,791,720 to Moore et al., the contents of which are hereby incorporated herein in their entirety.

Windshield hinges of this configuration have generally performed adequately. However, they can be relatively expensive to install on the windshield panels. In addition, retrofitting of a windshield panel that is broken or damaged is difficult.

SUMMARY OF THE INVENTION

As a first aspect, embodiments of the present invention are directed to a hinge assembly for a vehicle windshield. The hinge assembly comprises a first holder, a second holder, and a hinge member. The first holder includes a first body and a first receptacle with a first opening and a first closed end, wherein a first axis is defined between the first closed end and the first opening, the first axis being normal to a first plane defined by the first opening. The second holder includes a second body and a second receptacle with a second opening and a second closed end, wherein a second axis is defined between the second closed end and the second opening, the second axis being normal to a second plane defined by the second opening. The hinge member is attached to the first and second holder and has first and second ends and defines a third axis. When the hinge member is in a relaxed condition, the first and second axes form oblique angles relative to the third axis. In this configuration, the hinge member is under less strain in the both of the open and closed positions than is the case with prior hinges.

As a second aspect, embodiments of the present invention are directed to a windshield assembly, comprising: an upper windshield panel that defines a first plane; a lower windshield panel that defines a second plane; and a hinge assembly. The hinge assembly comprises: a first holder mounted to the upper windshield panel; a second holder mounted to the lower windshield panel; and a hinge member attached to the first and second holders, the hinge member having first and second ends and defining an axis. The upper windshield panel can pivot about the hinge assembly relative to the lower windshield panel between a closed position, in which the upper windshield panel it is substantially coplanar with the lower windshield panel, and an open position, in which the upper windshield panel is inverted and is generally parallel with the lower windshield panel. When the hinge member is in a relaxed condition, the first and second planes form oblique angles relative to the axis.

As a third aspect, embodiments of the present invention are directed to a method of forming a hinge assembly, comprising the step of coextruding a first holder, a second holder, and a hinge member. The first holder includes a first body and a first receptacle with a first opening and a first closed end, a first axis being defined between the first closed end and the first opening, the first axis being normal to a first plane defined by the first opening. The second holder includes a second body and a second receptacle with a second opening and a second closed end, a second axis being defined between the second closed end and the second opening, the second axis being normal to a second plane defined by the second opening. The hinge member is attached to the first and second holders, the hinge member having first and second ends and defining a third axis that forms oblique angles with the first and second axes.

BRIEF DESCRIPTION OF THE FIGURES

FIG. 1 is a perspective view of a golf cart with a windshield assembly according to embodiments of the present invention, with the windshield in a closed position.

FIG. 2 is an enlarged perspective view of the windshield assembly of FIG. 1, with the windshield in a partially open position.

FIG. 3 is a greatly enlarged view of the hinge of the windshield assembly of FIG. 2, with the hinge member shown in a relaxed position.

FIG. 4 is a greatly enlarged view of the hinge of FIG. 3, with the hinge member shown as the windshield is in a closed position.

DETAILED DESCRIPTION OF EMBODIMENTS OF THE INVENTION

Figure 5:
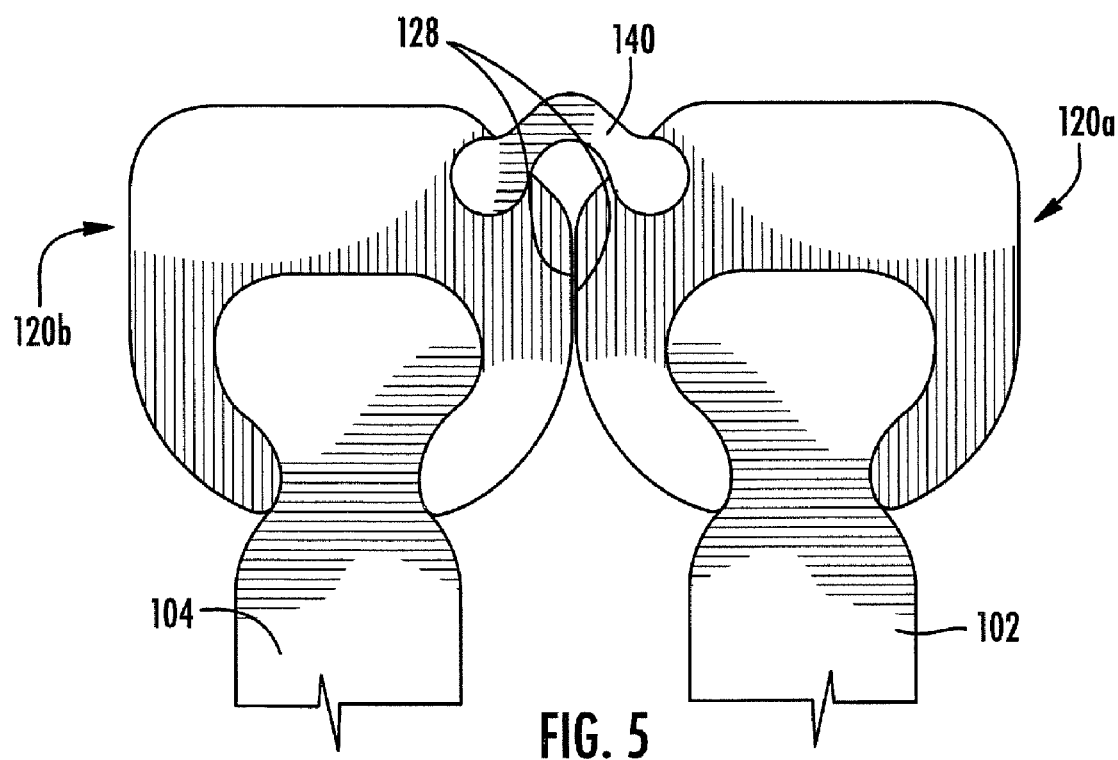
FIG. 5 is a greatly enlarged view of the hinge of FIG. 3, with the hinge member shown as the windshield is in an open position.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein the expression "and/or" includes any and all combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

With further reference to the drawings, FIG. 1 illustrates a windshield assembly 100 according to embodiments of the invention releasably attached to the frame 17 of a golf cart 20 or other recreational vehicle. As used herein, "recreational vehicle" is defined to include recreational vehicles such as golf carts and utility vehicles such as a vehicle manufactured by Kawasaki sold under the name Mule™. Generally the vehicle frame 17 is supported on front wheels 18 and rear wheels 19. The frame 17 includes a pair of spaced apart upright support posts 21 (only one post 21 is visible in FIG. 1). The upright support posts 21 define the front of the recreational vehicle 20.

The upright posts 21 of the recreational vehicle 20 shown in FIG. 1 are commonly secured in holes or on the sides of certain vehicle frames 17. Examples of this post frame configuration are found, for example, on some golf carts manufactured and sold under the name E-Z-GO®. Other recreational vehicles or golf carts 20 include a post configuration having generally U-shaped post frame. This U-shaped post frame includes a horizontal frame post attached between or integrally formed with the pair of spaced apart upright posts 21 for attachment of certain windshield assemblies. These U-shaped post frames are typically bolted on the side of the vehicle frame 17. Examples of such U-shaped post frames are found on some golf carts manufactured by Club Car, Yamaha, and Melex. As used herein, "spaced apart upright posts" refers to recreational vehicle post configurations including the U-shaped post frame described above, spaced apart separate posts attached to opposite sides of a recreational vehicle as described above, and any other recreational vehicle post configuration which includes at least two spaced upright posts attached in any manner to a recreational vehicle.

In the illustrated embodiment, the recreational vehicle frame 17 can also comprise a pair of rear upright posts 23 (only one post 23 is visible in FIG. 1). The upright posts 21, 23 support the covering or canopy 25 of the golf cart 20 if present.

Referring now to FIG. 2, the windshield assembly 100 includes an upper panel 102 and a lower panel 104 that are pivotally interconnected by a hinge assembly 110. Each of the upper and lower panels 102, 104 includes along the length of its edge 112 a knob 114 and a neck 116 (see FIG. 4) that fit within one of two holders 120a, 120b in the manner described below. The upper and lower panels 102, 104 are typically formed of a transparent material, such as polycarbonate or the like.

Those skilled in this art will appreciate that, although the upper and lower panels 102, 104 are shown herein as being essentially identical, this need not be the case. Also, the knob 114 and/or neck 116 are shown as being continuous, but may be discontinuous along the edge of their respective panel. The knob 114 and neck 116 may be replaced with a projection or structure of any configuration that can be held in place by one of the holders 120a, 120b.

Referring now to FIG. 3, each of the holders 120a, 120b includes a body 122 that has a receptacle 124. Each of the receptacles 124 has an opening 126 defined by fingers 127 that defines a plane P, wherein the opening 126 is narrower than the receptacle 124. An axis A1 is defined between the closed end of the receptacle 124 and the opening 126 that is normal to the plane P. The body 122 of each holder 120a, 120b also has an open position bearing surface 128 and, at approximately 90 degrees thereto, a closed position bearing surface 130. The body 122 of each holder also includes a pocket 132 in a beveled edge 131 that is positioned between the open and closed bearing surfaces 128, 130. An axis A2 is defined by the closed end and the opening of the pocket that is normal to the opening of the pocket 132.

Typically, and as illustrated, the holders 120a, 120b are mirror images of each other about a plane that is positioned between and perpendicular to the beveled surfaces 131. However, in some embodiments the holders 120a, 120b need not be mirror images. Typically, the holders 120a, 120b are formed of a polymeric material, such as acrylic.

Referring still to FIG. 3, a hinge member 140 comprises a central beam 141 with knobs 142 positioned at either end. The knobs 142 are received in the pockets 132 of respective holders 120a, 120b. As such, the hinge member forms an axis A3 between the knobs 142, the axis A3 forming oblique angles α1, α2 (typically between about 125 and 145 degrees, and more typically between about 130 and 140 degrees) with the axes A1. The hinge member 140 is typically formed of a flexible, resilient material, such as nylon, thermoplastic polyurethane, or the like, that is suitable for inclusion in a "living hinge."

In the neutral position shown in FIG. 3, the hinge assembly 100 is positioned such that the hinge member 140 is relaxed, i.e., under minimal or no strain. In such a position, the axis A1 forms an angle α1 of approximately 90 degrees with the axis A3 (which is parallel to the axes A2), as do the upper and lower panels 102, 104 of the windshield 100. Also, in the illustrated embodiment the holders 120a, 120b do not contact each other.

When, as shown in FIG. 4, the windshield assembly 100 is in a closed position (i.e., the upper and lower panels 102, 104 are generally coplanar, with the upper panel 102 above the lower panel 104). The holder 120b is rotated approximately 45 degrees relative to the holder 120a from the neutral position of FIG. 3. This rotation (clockwise from the vantage point of FIGS. 3 and 4) is permitted by the flexibility of the hinge member 140. The open position bearing surfaces 128 of the holders 120a, 120b confront (and in the illustrated embodiment contact) each other, such that the upper panel 102 is supported by the lower panel 104. The upper panel 102 may also be held in place by clips 10 or the like (see FIG. 1), such as those illustrated and described in U.S. Pat. No. 5,791,720 to Moore et al., supra.

When, as shown in FIG. 5, the windshield assembly 100 is in an open position (i.e., the upper and lower panels 102, 104 are generally parallel but non-coplanar, with the upper panel being inverted from its orientation in the closed position). The holder 120b is rotated approximately 45 degrees from the neutral position of FIG. 3 (this rotation is counterclockwise from the vantage point of FIGS. 3 and 5). The closed position bearing surfaces 130 of the holders 120a, 120b confront, and in some embodiments, contact each other.

Because the "neutral" position of the hinge member 140 (FIG. 3) is between the open position of FIG. 4 and the closed position of FIG. 5, movement to either of these positions places less stress on the hinge member 140 in either of these positions than would be the case if the hinge member 140 were relaxed in one of the open or closed positions and fully strained in the other. This lower stress level may increase the life of the hinge member 140.

In some embodiments, the holders 120a, 120b and the hinge member 140 may be coextruded in a single manufacturing operation. Such a process can simplify manufacturing and reduce the cost of the hinge assembly 110. After the formation of the hinge assembly 110, the upper and lower panels 102, 104 can be inserted into the receptacles 124 of the holders 120a, 120b by sliding the edges of the panels 102, 104 along the long axes of the holders 120a, 120b. Assembling the windshield assembly 100 in this manner is simple and can enable a broken panel 102, 104 or hinge assembly 110 to be replaced easily.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A hinge assembly for a vehicle windshield, comprising:
   a first holder, the first holder including a first body and a first receptacle with a first opening and a first closed end, wherein a first axis is defined between the first closed end and the first opening, the first axis being normal to a first plane defined by the first opening;
   a second holder, the second holder including a second body and a second receptacle with a second opening and a second closed end, wherein a second axis is defined between the second closed end and the second opening, the second axis being normal to a second plane defined by the second opening; and
   a flexible hinge member attached to the first and second holders, the hinge member having first and second ends and defining a third axis;
   wherein, when the hinge member is in a relaxed condition, the first and second axes form oblique angles relative to the third axis.

2. The hinge assembly defined in claim 1, wherein the oblique angles are between about 125 and 145 degrees.

3. The hinge assembly defined in claim 1, wherein the oblique angles are between about 130 and 140 degrees.

4. The hinge assembly defined in claim 1, wherein a width of the first and second openings is smaller than a width of the first and second receptacles.

5. The hinge assembly defined in claim 1, wherein the first and second holders each include open position bearing surfaces that confront each other when the first and second holders are moved to an open position;
   wherein in the open position, the first and second axes are generally parallel.

6. The hinge assembly defined in claim 1, wherein the first and second holders each include closed position bearing surfaces that confront each other when the first and second holders are moved to a closed position;
   wherein in the closed position, the first and second axes are substantially coplanar.

7. The hinge assembly defined in claim 1, wherein the hinge member comprises nylon.

8. The hinge assembly defined in claim 1, wherein the first and second holders are formed of acrylic.

9. The hinge assembly defined in claim 1, wherein the first and second holders are co-extruded with the hinge member.

10. The hinge assembly defined in claim 9, wherein the hinge member includes knobs at each end that are captured by the first and second holders.

11. A windshield assembly, comprising:
    an upper windshield panel that defines a first plane;
    a lower windshield panel that defines a second plane; and
    a hinge assembly, comprising:
    a first holder mounted to the upper windshield panel;
    a second holder mounted to the lower windshield panel; and
    a flexible hinge member attached to the first and second holders, the hinge member having first and second ends and defining an axis;
    wherein the upper windshield panel can pivot about the hinge assembly relative to the lower windshield panel between a closed position, in which the upper windshield panel it is substantially coplanar with the lower windshield panel, and an open position, in which the upper windshield panel is inverted and is generally parallel with the lower windshield panel; and
    wherein, when the hinge member is in a relaxed condition, the first and second planes form oblique angles relative to the axis.

12. The windshield assembly defined in claim 11, wherein the upper windshield panel has a knob and a necked portion and a lower edge thereof, and wherein the knob is received within a first receptacle in the first holder.

13. The windshield assembly defined in claim 1, wherein the oblique angles are between about 125 and 145 degrees.

14. The windshield assembly defined in claim 11, wherein the oblique angles are between about 130 and 140 degrees.

15. The windshield assembly defined in claim 11, wherein the first and second holders each include open position bearing surfaces that confront each other when the upper and lower windshield panels are moved to the open position.

16. The windshield assembly defined in claim 11, wherein the first and second holders each include closed position bearing surfaces that confront each other when the upper and lower windshield panels are moved to the closed position.

17. The windshield assembly defined in claim 11, wherein the first and second holders are co-extruded with the hinge member.

18. The windshield assembly defined in claim 17, wherein the hinge member includes knobs at each end that are captured by the first and second holders.

19. A hinge assembly for a vehicle windshield, comprising:
a first holder, the first holder including a first body and a first receptacle with a first opening and a first closed end, wherein a first axis is defined between the first closed end and the first opening, the first axis being normal to a first plane defined by the first opening;
a second holder, the second holder including a second body and a second receptacle with a second opening and a second closed end, wherein a second axis is defined between the second closed end and the second opening, the second axis being normal to a second plane defined by the second opening; and
a flexible hinge member attached to the first and second holders, the hinge member having first and second ends and defining a third axis and a central portion between the first and second ends;
wherein, when the hinge member is in a relaxed condition, the first and second axes form oblique angles relative to the third axis; and
wherein in the relaxed condition, the central portion of the hinge member is substantially planar with the third axis.

20. A hinge assembly for a vehicle windshield, comprising:
a first holder, the first holder including a first body and a first receptacle with a first opening and a first closed end, wherein a first axis is defined between the first closed end and the first opening, the first axis being normal to a first plane defined by the first opening;
a second holder, the second holder including a second body and a second receptacle with a second opening and a second closed end, wherein a second axis is defined between the second closed end and the second opening, the second axis being normal to a second plane defined by the second opening; and
a flexible hinge member attached to the first and second holders, the hinge member having first and second ends and defining a third axis;
wherein, when the distance between the first and second ends is maximized, the first and second axes form oblique angles relative to the third axis.

21. A windshield assembly, comprising:
an upper windshield panel that defines a first plane;
a lower windshield panel that defines a second plane; and
a hinge assembly, comprising:
a first holder mounted to the upper windshield panel;
a second holder mounted to the lower windshield panel; and
a flexible hinge member attached to the first and second holders, the hinge member having first and second ends and defining an axis;
wherein the upper windshield panel can pivot about the hinge assembly relative to the lower windshield panel between a closed position, in which the upper windshield panel is substantially coplanar with the lower windshield panel, and an open position, in which the upper windshield panel is inverted and is generally parallel with the lower windshield panel; and
wherein, when the upper and lower windshield panels form a substantially right angle relative to each other, the upper and lower windshield panels form oblique angles relative to the axis.

* * * * *

UNITED STATES PATENT AND TRADEMARK OFFICE
CERTIFICATE OF CORRECTION

| | |
|---|---|
| PATENT NO. | : 7,673,923 B2 |
| APPLICATION NO. | : 12/045747 |
| DATED | : March 9, 2010 |
| INVENTOR(S) | : Reese |

Page 1 of 1

It is certified that error appears in the above-identified patent and that said Letters Patent is hereby corrected as shown below:

In the Claims:
Column 6, Claim 11, Line 61: Please correct "panel it is" to read -- panel is --

Column 7, Claim 13, Line 5: Please correct "claim 1," to read -- claim 11, --

Signed and Sealed this

Third Day of August, 2010

David J. Kappos
*Director of the United States Patent and Trademark Office*